United States Patent Office 3,528,843
Patented Sept. 15, 1970

3,528,843
METHOD OF PREPARING A CAULKED AND RESIN COATED SUBSTRATE
Frederick C. Leitert and Edmund Schalin, Mentor, Ohio, and Michael E. Kucsma, Baton Rouge, La., assignors to Diamond Shamrock Corporation, a corporation of Delaware
No Drawing. Filed Sept. 28, 1967, Ser. No. 671,212
Int. Cl. B32b *15/08;* B44d *1/14*
U.S. Cl. 117—45                                                          4 Claims

ABSTRACT OF THE DISCLOSURE

Coatings such as of polyvinyl fluoride can be conveniently applied and fused on surfaces capable of sustaining a high temperature bake, such as a metal surface. However, quite often such surfaces contain crevices around joints or spot welds or other surface irregularities which require that the polyvinyl fluoride, for example, bridge over an indentation or fold in the surface. Desirably such an imperfection is filled prior to application of the polyvinyl fluoride coating or the like. Such a filling can be a caulk composition comprising fluid epoxy resin plus fluid polymercaptan resin, and an accelerator, which composition is cured to a tack free condition prior to application and coalescence of the topcoating.

BACKGROUND OF THE INVENTION

Polyvinyl fluoride coatings, for example, offer chemical resistance to substrates such as metal, ceramic, brick, stone, concrete, and other substates capable of sustaining coalescence temperatures for the polyvinyl fluoride coatings such as, for example, 450–800° F. for a period of time of typically one to twenty minutes. However, such surfaces can often contain crevices, and like surface irregularities, particularly around joints where separate pieces of the substrate have been brought together. Typically, a topcoating such as a polyvinyl fluoride topcoating can successfully bridge such imperfections having a width of not more than about 2 mils. It is therefore desirable to first grout or caulk larger surfaces imperfections prior to coating of the substrate.

However, a topcoating such as polyvinyl fluoride coating presents severe coalescing conditions, e.g., high temperature baking during solvent evaporation. Additionally, any caulking material serviceable under such a system must exhibit desirable adhesion not only to the substrate, for example clean metal surfaces, but also exhibit desirable adhesion to the topcoating after application of the coating and fusion thereof. Additionally, to be readily useful it is necessary that such caulking compositions have short cure times, typically less than about 20 minutes, and additionally the finished product should exhibit desirable performance under conditions of chemical attack, such as extended exposure to detergent solutions.

Hence, the requirements for fusing a topcoating such as a polyvinyl fluoride coating, plus these other factors just mentioned, present extrememely difficult conditions that must be met for a successful caulking composition. For example, the curing temperatures required to fuse a polyvinyl fluoride coating, as well as the fusion times for heating at such temperatures, immediately eliminates an extensive number of possible caulking canidates, such as those based on polyvinyl chloride. Additionally, compositions which are well known for withstanding high temperature conditions, such as silicone-containing compositions, have proven to have insufficient adherence to a polyvinyl fluoride topcoating. Moreover, other high temperature resistant materials such as epoxy-phenolic compositions require a cure time at normal room temperature of many hours, and are therefore not practicable.

It is thus an object of the present invention to extend the utility of high-bake coatings, for example polyvinyl fluoride coatings, to substrates capable of withstanding polyvinyl fluoride coating temperatures and having surface imperfections requiring gouting prior to such coating.

A further object of the invention is to provide a polyvinyl fluoride coating or the like at least partially topcoating a substrate in part covered by a gouting or caulking composition which enhances the covering power of such topcoating for the substrate.

SUMMARY OF THE INVENTION

Thus, broadly the present invention is directed to the method of preparing a coated substrate, wherein a caulk is applied to a portion of such substrate prior to coating, and the coating requires a high bake temperature of between about 200–800° F. to prepare such coated substrate, which method comprises applying to the substrate a fluid caulking composition comprising an accelerator and fluid epoxy resin plus fluid polymercaptan resin, such composition having a ratio of epoxy equivalent weight to mercaptan equivalent weight of about 1:1; curing the applied caulk at a temperature maintained within the range from about 10° C. to about 100° C., and for a time of between about 1–20 minutes, thereby preparing a tack-free caulk; and applying the coating to the resulting caulked substrate, while permitting heating of such coating at a temperature maintained within the range from about 200° F. to about 800° F., thereby preparing the coated substrate, wherein in the applied caulking composition the polymercaptan resin has an SH functionality of at least two and the epoxy resin has an epoxy functionality of at least two.

One particular aspect of the invention relates to applying a polyvinyl fluoride coating composition and further to heating such coating, to fuse the polyvinyl fluoride resin contained therein, at a temperature maintained within the range from about 450° F. to about 800° F. for a time of between about 0.5–20 minutes.

DESCRIPTION OF THE PREFERRED EMBODIMENTS

The polymercaptan resin component for the caulking composition must have an SH functionality of at least two, that is, it must have an average of two or more —SH groups per resin molecule. Additionally, the resin should be virtually free from molecules bearing only one —SH group, so that the molecules of the polymercaptan resin component must contain two or more, e.g., up to 10, —SH groups per molecule. Compositions containing resin molecules which have substantially only one —SH group per molecule, can be subject to undesirable flow during and after application, and exhibit poor high temperature resistance.

Advantageously, for preparing cured products of enhanced resistance to flow as well as augmented high temperature resistance, which products also have desirable tensile strength in use, a resin is used which has an SH functionality between about 2–10. Additionally, the polymercaptan resin component should have a number average molecule weight between about 200–10,000. For example resins having an SH functionality of at least two or greater, but which have molecular weight above about 10,000 can be highly viscous, and can be difficult to formulate with fillers, pigments, and the like.

Exemplary resins for the polymercaptan component are those resins prepared from polyepoxides having an epoxy equivalency of at least two, i.e., the number of epoxy groups contained in the average polyepoxide molecule is 2 or greater. Such polyepoxides can be employed in preparing the polymercaptan resin by reaction with hydrogen sulfide. Additionally polymercaptan resin can be prepared by reaction of polyhalohydrins with a metallic sulfhydrate such as sodium sulfhydrate or potassium sulfhydrate.

Examples of the such polyhalohydrins which can be used in forming the polymercaptan resin include the polyhalohydrin-containing polymeric reaction product of a halogen-containing epoxide, e.g., epichlorohydrin, with an aliphatic polyhydric alcohol, e.g, glycerol, pentaerythritol, 1,2,6-hexanetriol, or 1,3,5-pentanetriol wherein a portion of the polyhalohydrin can be formed from an aromatic polyhydric phenol such as resorcinol, catechol, or bisphenol, and a halogen-containing epoxide such as an epihalohydrin of 3-chloro - 1,2 - epoxybutane. Additionally, such polyhalohydrins can be converted to polyepoxides which in turn can be reacted with $H_2S$ to form polymercaptans. Further any suitable polyepoxide, regardless of method of production, can typically be reacted with $H_2S$ to form a polymercaptan useful in the present invention.

The polyepoxides used with the polymercaptan resin in the caulking composition are those compounds possessing an average of at least two, or more, epoxy groups per molecule. The number of epoxy groups contained in the average molecule is obtained by dividing the average molecular weight of the polyepoxide by the epoxide equivalent weight. The polyepoxides may be saturated or unsaturated, aliphatic, cycloaliphatic, aromatic or heterocyclic and may be substituted if desired with non-interfering substituents, such as halogen atoms, hydroxyl groups and ether radicals. They may also be monomer or polymeric. The polyepoxides are fluid materials for ready blending with the fluid polymercaptan resin, i.e., usually have a viscosity desirably lower than, or substantially the same as, the viscosity of polymercaptan resins.

Suitable polyepoxy compounds have been shown, for example, in British Pat. 1,024,396, and include glycidyl ethers of polyhydric phenols such as diphenylol alkanes, e.g., diphenylol propane, diphenylol ethane and diphenylol methane, diphenylol sulphone, hydroquinone, resorcinol, dihydroxydiphenyl, dihydroxynaphthalenes, and polyvalent phenols such as novolacs, and resols, which have been prepared by condensation of phenol and formaldehyde. Other suitable polyepoxy compounds for blending with the polymercaptan resin include poly(epoxy alkyl)-ethers of aliphatic polyhydroxy compounds such as ethylene glycol, glycerol and trimethylolpropane, poly(epoxy alkyl) esters of polycarboxylic acids, such as the diglycidyl esters of phthalic acid, terephthalic acid and adipic acid, and polyglycidyl esters of polymer unsaturated fatty acids, for example, diglycidyl ester of dimerized linoleic acid; epoxidized esters of unsaturated acids, such as epoxidized linseed oil or soybean oil; epoxidized dienes such as diepoxybutane and epoxidized vinylcyclohexene; di(epoxy alkyl) ethers in which two epoxy alkyl groups are connected by only one oxygen atom, such as diglycidyl ether; and polyepoxy compounds obtained by epoxidation of cyclohexene derivatives, such as the (3,4-epoxy-6-methyl-cyclohexyl) methyl ester of 3,4-epoxy-6-methylcyclohexane carboxylic acid.

The polyepoxide and polymercaptan resins are contained in the caulking composition in a ratio of epoxy equivalent weight to mercaptan equivalent weight of about 1:1 to provide for enhanced reaction of the constituents. The mercaptan equivalent weight for the polymercaptan component can be determined by dividing the number of —SH groups contained in the average molecule into the average molecular weight of the polymercaptan resin. Generally not more than about a ten percent deviation is employed in this ratio to advantageously prepare cured caulking materials having desirable adherence to both the substrate and the polyvinyl fluoride topcoating.

The accelerators for curing the polyepoxide and polymercaptan-containing caulk include among others, phenols, sulfides, amines, organic phosphines, organic arsines, organic antimony compounds, amine salts, or quaternary ammonium salts. Preferred accelerators are typically tertiary amines, such as benzyldimethylamine, triethylene diamine, methyldiethanolamine, tri-n-butyl amine, tri-n-hexylamine, tris dimethylaminomethylphenol, ethyl di-n-propylamine, dimethylaminomethylphenol, and the like, and mixtures thereof.

The ingredients of the caulking composition are typically simply blended together with agitation such as hand mixing or machine agitation. Alternatively roll milling can be used, for example, for mixing. The resulting compositions can then be readily cured under normal pressure of 760 mm. Hg at or about room temperature, e.g., slightly below or above such temperature. Although higher curing temperatures can be used, usually the curing is performed within a temperature range of between about 10–100° C. for economy, and preferably, for best economy, within a range of about 20–50° C.

After application, the caulking composition should cure to a tack-free condition in about 1–20 minutes, i.e., cure in about 1–20 minutes to an ostensibly hardened material which does not adhere to the hand when touched with moderate pressure. Compositions which can cure more rapidly than about one minute after application, e.g., have a pot life of less than about three minutes, can become undesirably hard in the applicator or before application, if a delay in application is encountered, and thus become difficult to apply. Compositions taking longer than about 20 minutes to cure are uneconomical. Preferably, for best economy without deleterious early curing, the caulking composition cures within about 5–15 minutes after its preparation. Typically, the caulking composition is simply applied to the substrate by ejection from a caulking gun or by trowelling onto the substrate but can be applied by any means used in the application of such compositions.

For enhanced economy and chemical resistance, the caulk contains pigments or fillers, such as titanium dioxide pigment or calcium carbonate pigment. However, to avoid cured caulking compositions which can crumble during application of the polyvinyl fluoride topcoating, the caulking composition usually does not contain pigments and fillers such that the weight of this material compared to the weight of the polymercaptan plus polyepoxide resins exceeds a weight ratio of above about 5:1. However, to afford preferred economy, the caulking compositions contain fillers and pigments in a weight ratio to the resins of from about 0.1:1 to about 1.0:1. The caulking composition can additionally include, typically, thixotropic agents, masstone pigments, plasticizers, and further resinous substances, as well as other additives or components which can be formulated into caulking compositions.

Where the topcoating contains polyvinyl fluoride, such polymer can be prepared according to known methods such as by a bulk, solution, suspension, or emulsion polymerization methods. The polyvinyl fluorides have a high molecular weight, as measured by the Staudinger method described in Industrial Engineering Chemistry, vol. 36, p. 1152 (1936), generally above 50,000 preferably possessing molecular weights up to about 300,000. They are polymers that are in a finely divided state of subdivision. Generally, the polymers have a particle size of less than about 5 microns, preferably a size ranging between 0.05 and 1 micron.

The fluidity of the topcoating composition may vary greatly, depending on the type of application and method of application desired. The amount of organic liquids in the topcoating composition is adjusted to give a fluid or sometimes viscous composition that is of suitable consistency for application to the substrate. This, of course, will vary greatly according to the manner of application; for instance, whether it is desired to spray the composition on the substrate, to dip the substrate into the composition; or to apply the composition on the substrate with some kind of roller system, as well as other factors like the temperature, the type of liquid dispersants employed, and the like. Generally, about 25 to 400 parts by weight of organic liquid per 100 parts of polymer are suitable for a polyvinyl fluoride coating, with preferably about 50 to 200 parts organic liquid to the weight of polymer.

The coating may be applied onto the surface of the substrate which is to be coated by any suitable procedure designed to give a coating of the thickness desired. For example, with a polyvinyl fluoride coating composition, the substrate may be coated by dipping into the polyvinyl fluoride, by spreading the polymer onto the surface, by spraying, by rolling, by percolating the polyvinylfluoride over or through the substrate, and by equivalent procedures. Dry, polyvinyl fluoride-containing coatings generally have a thickness of about 0.5 to 3 mils.

In addition to polyvinyl fluoride-containing coating compositions, coatings requiring elevated temperature heating for preparing a coated substrate, and thus coatings which can be employed in the present invention, can include polypropylene resin-containing coating compositions as well as paints, which can be unpigmented or contain pigment in a binder. Such paints requiring elevated temperature heating include solvent reduced or water reduced paints containing modified or soluble alkyds and also oil paints including acrylic resin paints.

After coating, the substrate is heated at a temperature sufficient to obtain a highly adherent uniform coating. Typically, the temperature employed is at least about 200° F. for efficiently and economically preparing the coated substrate. For the polyvinyl fluoride-containing coatings, the coated substrate is heated at a temperature in excess of 450° F. for a sufficient period of time to effect adhesion of the coating to the substrate and caulking composition by vaporizing the solvent from the coating leaving the polyvinyl fluoride on the substrate as a coalesced homogeneous structure essentially free of any liquid phase of the original dispersion. Specifically, for the polyvinyl fluoride-containing coatings, the coated substrate is subjected to heating at temperatures in the range of about 450° F. up to about 800° F., preferably temperatures within the range of about 50° to 700° F., for a period of time of from about 30 seconds up to about 20 minutes, preferably about 2 to 10 minutes, to give a coating of polyvinyl fluoride possessing excellent adhesion and which is flexible, tough, and chemically inert.

The following examples show ways in which the invention can be practiced but should not be construed as limiting the invention. In the examples all parts are parts by weight and all temperatures are in degrees centigrade unless otherwise specified.

In the examples, the chemical resistance of finished articles is measured by exposure to a detergent solution. The solution is a bath maintained at a constant temperature of 165° F. and panels containing the caulking compositions and cured polyvinyl fluoride topcoatings are simply immersed in the bath for specified periods. In the bath each 10,000 weight parts of distilled water contains 40.3 weight parts of sodium pyrophosphate, 30.3 weight parts sodium sulfate, 11.2 weight parts sodium metasilicate, 3.0 weight parts of sodium carbonate, and 38.0 weight parts of a wetting agent containing 80% by weight of sodium dodecylbenzene sulfonate.

The polyvinyl fluoride dispersion coating employed in the following examples contains, basic 10 weight parts of material, 22.02 parts resin, 5.85 parts rutile titanium dioxide pigment, 1.41 parts synthetic calcium silicate pigment, 0.13 part tripentaerythritol, 0.54 part of mixed inorganic pigments containing chrome-cobalt-aluminum inorganic salts and titanium dioxide pigment dosed with iron and cobalt oxides, 0.13 part of a thermal stabilizer which is a powdery material having a white appearance and formulated to contain zinc, and 69.92 parts of dimethyl phthalate. The coating is prepared by blending on a pebble mill for 18 hours a portion of the dimethyl phthalate with the balance of the ingredients excluding the resin. The resulting slurry is then mixed with the balance of the dimethyl phthalate plus resin to prepare the final material.

EXAMPLE 1

A metal substrate of cold rolled steel is pretreated prior to use to deposit 150 milligrams per square foot of substrate of calcium-zinc phosphate salt. A caulking composition is prepared from a polymercaptan resin which is a viscous liquid having a molecular weight of about 1365, an SH functionality of 5.1 as measured by iodimetric titration, a pH of 4, a viscosity in poises at 25° of 156, and 3.8 milliequivalents of SH groups per gram of polymer. The resin is prepared from a polyol reacted with epichlorohydrin. The resulting α-chlorohydrin adduct is dehydrochlorinated with a base to a polyepoxide which is converted to a polymercaptan with hydrogen sulfide.

To 400 parts of this resin, there is blended on a three roll mill 300 parts of anatase titanium dioxide pigment having an average particle size of 0.25 micron. The resulting slurry from the mill is placed in an oil bath held at a temperature of 60°, and under a vacuum down to 0.3 mm. Hg pressure, while stirring to remove volatile components. The same reduced pressure procedure is performed on an epoxy resin having an epoxy equivalent weight of 185–186, an epoxy value of 0.51–0.54 in epoxy equivalent per 100 grams of resin, and a viscosity in centipoises at 25° of 12,000–16,000.

To 15 parts of the resulting pigmented polymercaptan resin, there is added 0.3 part of an accelerator, which is a 33 weight percent solution of triethylene diamine in dipropylene glycol, and 6 parts of the epoxy resin. A bead of the resulting blend is triggered from a caulking gun across the width of a 4″ x 6″ panel of the above-mentioned steel substrate thus forming a 4″ bead of about ¼″ width and ¼″ maximum depth. The bead becomes tack-free to the touch in about 5–10 minutes.

Thereafter, bending of the panel through a 90° arc to achieve a bend in the panel at the point of the applied caulk, with the caulk at the outside of the bend, does not dislodge the caulk. Moreover, manually forcing a knife under the caulk to peel or lift the caulk away from the metal substrate is ineffective for removing the caulk. Thus, the caulk is regarded as demonstrating strong adhesion to the metal.

The resulting caulked panel is spray coated with the polyvinyl fluoride material described hereinbefore. The resulting topcoated panel is baked for 9 minutes at a metal temperature of 500° F. thereby preparing a coated panel having an average topcoating thickness of about 2 mils and free from surface defects under visual inspection. Subsequently the coating is scribed with a knife, through to the metal and the caulk, in an X configuration with the intersection of the scribe lines at the position of the caulk. A knife is then used to manually lift the topcoating from the caulk at the V's formed by the intersection of the scribe lines. However, only chips can be removed containing caulking composition adhering to the polyvinyl fluoride topcoating, thereby demonstrating that the adhesion of caulk to topcoating is greater than the tensile strength of the topcoating film and thus showing strong adhesion between topcoating and caulk.

Finished panels are also immersed in the detergent bath earlier described to determine chemical resistance of the coating. Such panels exhibit satisfactory performance, i.e., adhesion of caulk to substrate and topcoating to caulk for up to 240 hours of continuous immersion in the 165° F. bath, thereby demonstrating serviceability for such finished articles in dishwasher applications and the like.

EXAMPLE 2

To 15 parts of the pigmented polymercaptan resin of Example 1 there is blended 0.3 part of triethylene diamine. The resulting blend is heated to a temperature of 50° for one hour, cooled, and then mixed with 6 parts of the epoxy resin of Example 1. A bead of the resulting blend is applied to a similar panel as those described in Example 1 in the manner of application described in Example 1. The bead becomes tack-free in about 5 to 10 minutes and thereafter exhibits strong adhesion to the panel when tested in the manner of Example 1.

The resulting panel is spray coated with polyvinyl fluoride material described hereinbefore and the resulting panel is baked for 9 minutes at a metal substrate temperature of 500° F. When the finished article is tested for topcoating-to-caulk adhesion in the manner of Example 1, strong adhesion between topcoating and caulk is exhibited.

EXAMPLE 3

To 200 parts of the polymercaptan resin described in Example 1 there is blended on a three roll mill 150 parts of calcium carbonate having a particle size of 0.1 micron. The resulting slurry from the mill is placed in an oil bath held at a temperature of 60°, stirred vigorously, and placed under a vacuum achieving a pressure of 0.7 mm. Hg.

To 15 parts of the resulting pigmented resin there is added 0.1 part of the accelerator of Example 1 and 6 parts of the epoxy resin of Example 1. A bead of the resulting blend is gun-applied to a steel panel described in Example 1. The resulting caulk has a tack-free time of five minutes and exhibits strong adhesion to the metal substrate when tested in the manned of Example 1. Subsequent topcoated panels prepared in the manner of Example 1 further show strong adhesion between topcoating and caulk.

We claim:

1. The method of preparing a coated substrate, wherein a caulk is applied to a portion of said substrate prior to coating of said substrate with a resin-containing coating, and the coating is heated at a temperature maintained within the range from about 200° F. to about 800° F. thereby preparing said coated substrate, which method comprises:

applying to said substrate a liquid caulking composition consisting essentially of an accelerator and liquid epoxy resin plus liquid polymercaptan resin having a number average molecular weight between about 200–10,000, said composition having an epoxy equivalent to mercaptan equivalent of about 1:1, and wherein said polymercaptan resin has an SH functionality of at least about 2 and said epoxy resin has an epoxy functionality of at least about 2;

curing the resulting applied caulking composition at a temperature maintained within the range from about 10° C. to about 100° C., and for a time of between about 1–20 minutes, thereby preparing a tack-free caulk; and applying said resin-containing coating to the resulting caulked substrate while permitting heating of said coating at a temperature maintained within the range from about 200° F. to about 800° F., thereby preparing said coated substrate.

2. The method of claim 1 wherein said caulking composition is cured at a temperature maintained within the range from about 20° C. to about 50° C., said caulking composition contains pigments and fillers, and the weight ratio of said pigments and fillers to said epoxy resin plus the polymercaptan resin in said composition is between about 0.1–5:1.

3. The method of preparing a polyvinyl fluoride coated substrate wherein a caulk is applied to a portion of said substrate prior to application of polyvinyl fluoride coating composition thereto, which method comprises:

applying to said substrate a liquid caulking composition consisting essentially of an accelerator and liquid epoxy resin plus liquid polymercaptan resin having a number average molecular weight between about 200–10,000, said composition having an epoxy equivalent to mercaptan equivalent of about 1:1, and wherein said polymercaptan resin has an SH functionality of at least about 2 and said epoxy resin has an epoxy functionality of at least about 2;

curing the resulting applied caulking composition at a temperature maintained within the range from about 10° C. to about 100° C. and for a time of between about 1–20 minutes, thereby preparing a tack-free caulk;

applying to the resulting caulked substrate a polyvinyl fluoride coating composition; and coalescing said applied coating composition at a temperature maintained within the range from about 450° F. to about 800° F. for a time of between about 0.5–20 minutes, thereby preparing said polyvinyl fluoride coated substrate.

4. The method of claim 3 wherein said polyvinyl fluoride coating composition contains polyvinyl fluoride resin and organic liquid in a weight ratio of liquid to resin of between about 0.25–4:1, said coating composition is applied in an amount sufficient for providing a coalesced coating having a thickness not substantially in excess of about 3 mils, and said coating is coalesced at a temperature maintained within the range from about 500° F. to about 700° F. for a time of between about 5–15 minutes.

References Cited

UNITED STATES PATENTS

| | | | |
|---|---|---|---|
| 3,111,426 | 11/1963 | Capron et al. | 117—75 |
| 3,297,473 | 1/1967 | Bulbenko | 117—72 |

WILLIAM D. MARTIN, Primary Examiner

R. HUSACK, Assistant Examiner

U.S. Cl. X.R.

117—72, 75, 123, 132